(12) United States Patent
Nishida et al.

(10) Patent No.: US 8,815,020 B2
(45) Date of Patent: Aug. 26, 2014

(54) METHOD OF MANUFACTURING A LAMINAR RING

(75) Inventors: Koji Nishida, Nisshin (JP); Yuji Suzuki, Kariya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 179 days.

(21) Appl. No.: 13/518,997

(22) PCT Filed: Dec. 25, 2009

(86) PCT No.: PCT/JP2009/071697
§ 371 (c)(1),
(2), (4) Date: Jun. 25, 2012

(87) PCT Pub. No.: WO2011/077579
PCT Pub. Date: Jun. 30, 2011

(65) Prior Publication Data
US 2012/0291923 A1    Nov. 22, 2012

(51) Int. Cl.
*C23C 8/24* (2006.01)
(52) U.S. Cl.
CPC .................................... *C23C 8/24* (2013.01)
USPC ............................................ 148/238; 148/206
(58) Field of Classification Search
CPC ........................................................ C23C 8/24
USPC ..................... 148/206, 212, 220, 230, 238
See application file for complete search history.

(56) References Cited

U.S. PATENT DOCUMENTS 6,631,542 B1 * 10/2003 Imai et al. ...................... 29/417

FOREIGN PATENT DOCUMENTS

| CN | 101061329 A | 10/2007 |
|---|---|---|
| JP | 10 169719 | 6/1998 |
| JP | 2001 329317 | 11/2001 |

(Continued)

OTHER PUBLICATIONS

International Search Report Issued Apr. 6, 2010 in PCT/JP09/71697 Filed Dec. 25, 2009.

*Primary Examiner* — Brian Walck
(74) *Attorney, Agent, or Firm* — Oblon, Spivak, McClelland, Maier & Neustadt, L.L.P.

(57) ABSTRACT

A method of manufacturing a laminar ring, which permits an improvement of efficiency of a nitriding treatment of a plurality of metallic band members which constitute the laminar ring is provided. The method includes a nitriding treatment step of subjecting first through ninth metallic band members to a nitriding treatment wherein the metallic band members are kept in an atmosphere including a nitriding gas by a predetermined concentration, for a predetermined length of time, while gaps are formed between circumferential portions of adjacent ones of the metallic band members laminated on each other such that a position of the gaps is moved relative to the metallic band members in a circumferential direction of the metallic band members, to permit nitrogen to diffuse into surface portions of the metallic band members, so that the nitriding gas can be sufficiently supplied between the adjacent ones of the metallic band members over their entire circumference, to permit the metallic band members to be sufficiently nitrided, even when the nitriding treatment is performed while the metallic band members are laminated on each other, whereby the metallic band members can be sufficiently nitrided, making it possible to increase the number of the metallic band members that can be nitrided at one time, and improve efficiency of the nitriding treatment of the metallic band members.

6 Claims, 8 Drawing Sheets

(56) References Cited

FOREIGN PATENT DOCUMENTS

| JP | 2003 105443 | 4/2003 |
| JP | 2003 226917 | 8/2003 |
| JP | 2004 257462 | 9/2004 |
| JP | 2005 337339 | 12/2005 |
| JP | 2008 520437 | 6/2008 |
| WO | WO 2006/054885 A1 | 5/2006 |

* cited by examiner

US 8,815,020 B2

METHOD OF MANUFACTURING A LAMINAR RING

TECHNICAL FIELD

The present invention relates to a method of manufacturing a laminar ring to be used for a power transmitting belt of a belt-type continuously variable transmission for a vehicle, and more particularly to techniques for improving efficiency of a nitriding treatment of a plurality of metallic band members which constitute the laminar ring.

BACKGROUND ART

There is known a laminar ring which is used for a power transmitting belt of a belt-type continuously variable transmission for a vehicle and which is constituted by a plurality of annular endless metallic band members having respective different circumferential lengths and tightly laminated on each other to support a plurality of elements arranged along an annulus of the annular metallic band members. For example, this laminar ring is manufactured by initially forming a cylindrical member by welding together opposite ends of a sheet of a hoop or band steel such as a maraging steel or stainless steel, then dividing the cylindrical member at a predetermined pitch in the axial direction, into a plurality of short cylindrical members, subsequently rolling the plurality of short cylindrical members in their direction of thickness, to form a plurality of annular metallic band members having respective different circumferential lengths, then subjecting the annular metallic band members to an aging treatment and a nitriding treatment to improve their hardness and wear resistance, and finally tightly laminating the annular metallic band members on each other. Patent Document 1 discloses an example of the method of manufacturing the laminar ring. This Patent Document 1 discloses a holding jig, which permits the metallic band members to be held without a specific manual operation, irrespective of the difference of their circumferential lengths which is used for the nitriding treatment.

PRIOR ART DOCUMENT

Patent Document 1: JP-2004-257462 A

SUMMARY OF THE INVENTION

Object Achieved by the Invention

According to the above-described conventional method of manufacturing the laminar ring, the nitriding treatment is performed for each of the plurality of annular metallic band members while each metallic band member is held by the holding jig, before the metallic band members are tightly laminated on each other, because the nitriding treatment performed for the laminated metallic band members does not permit sufficient nitriding of surface portions of all metallic band members, due to difficult flows of a nitriding gas between the adjacent metallic band members. Accordingly, the efficiency of the nitriding treatment is low, and the manufacturing cost is high due to a need of using a large-sized nitriding furnace, for instance.

The present invention was made in view of the background art described above. It is therefore an object of the present invention to provide a method of manufacturing a laminar ring, which permits an improvement of the efficiency of the nitriding treatment of the plurality of metallic band members which constitute the laminar ring.

Means for Achieving the Object

The object indicated above is achieved according to the present invention of a first embodiment, which provides (a) a method of manufacturing a laminar ring which is used for a power transmitting belt of a belt-type continuously variable transmission for a vehicle and which is constituted by a plurality of annular endless metallic band members having respective different circumferential lengths and tightly laminated on each other to support a plurality of circularly arranged elements, (b) characterized by comprising a nitriding treatment step of subjecting surfaces of the above-described plurality of metallic band members to a nitriding treatment wherein the metallic band members are kept in a controlled predetermined atmosphere for a predetermined length of time while gaps are formed between circumferential portions of adjacent ones of the metallic band members laminated on each other such that a position of the gaps is moved relative to the metallic band members in a circumferential direction of the metallic band members.

According to the invention of a second embodiment, the above-described gaps are formed by pressing the above-described plurality of metallic band members laminated on each other constituting the above-described one laminar ring and having the respective different circumferential lengths, at a circumferential position of the metallic band members in a radially inward direction of the metallic band members.

According to the invention of a third embodiment, the above-described gaps are formed by laminating on each other a plurality of metallic band members corresponding to a same layer of said laminar ring of a same circumferential length selected from a plurality of sets of the above-described metallic band members each of which constitutes the above-described laminar ring, the metallic band members of each of the above-described plurality of sets having respective different circumferential lengths, or laminating on each other a plurality of metallic band members of each of at least one set which constitutes the above-described laminar ring such that a circumferential length of the metallic band members increases in a radially inward direction of the metallic band members.

According to the invention of a fourth embodiment, the above-described gaps are formed by laminating on each other a plurality of metallic band members of different circumferential lengths which are selected from the above-described plurality of metallic band members constituting the above-described laminar ring and which are not radially adjacent to each other.

According to the invention of a fifth embodiment, the above-described gaps are formed by laminating on each other a plurality of metallic band members which are selected from the above-described plurality of metallic band members of the different circumferential lengths constituting the above-described laminar ring, and which are odd-numbered or even-numbered as counted from the innermost metallic band member of the laminar ring.

According to the invention of a sixth embodiment, the above-described nitriding treatment step is implemented by using a nitriding furnace including (a-1) a transferring platform to be continuously fed in a furnace chamber having the above-described controlled predetermined atmosphere, (a-2) at least one pair of mutually parallel support rollers disposed rotatably on the transferring platform and engaging the above-described plurality of metallic band members laminated on each other, to support the metallic band members, and (a-3) a rotary driving member disposed rotatably on the above-described transferring platform and engaging a stationary engaging member fixedly disposed in the above-described furnace chamber, the rotary driving member being rotated by the stationary engaging member, to apply a torque to the above-described support rollers for rotating the support rollers, and (b) the above-described plurality of metallic band members laminated on each other and supported by the above-described support rollers are rotated by the support rollers during continuous feeding of the above-described transferring platform in the above-described furnace chamber, so that the position of the above-described gaps is moved relative to the metallic band members in the circumferential direction of the metallic band members.

Advantages of the Invention

The method of manufacturing a laminar ring according to a first embodiment comprises the nitriding treatment step of subjecting surfaces of the above-described plurality of metallic band members to the nitriding treatment wherein the metallic band members are kept in the controlled predetermined atmosphere for the predetermined length of time while the gaps are formed between the circumferential portions of the adjacent ones of the metallic band members laminated on each other such that the position of the gaps is moved relative to the band members in the circumferential direction of the metallic band members, so that the nitriding gas can be sufficiently supplied between the adjacent ones of the metallic band members over their entire circumference, to permit the surface portions of the radially intermediate metallic band member or members to be sufficiently nitrided over their entire circumference, even when the nitriding treatment is performed while the metallic band members are laminated on each other, making it possible to increase the number of the metallic band members that can be nitrided at one time, and improve efficiency of the nitriding treatment of the metallic band members. For example, the present method permits the nitriding treatment of a comparatively large number of the metallic band members at one time, by using a comparatively small-sized nitriding treatment furnace, and accordingly has an advantage of a reduced cost of manufacture of the laminar ring.

In the method of manufacturing the laminar ring according to the invention of a second embodiment, the above-described gaps are formed by pressing the above-described plurality of metallic band members laminated on each other constituting the above-described one laminar ring and having the respective different circumferential lengths, at a circumferential position of the metallic band members in the radially inward direction of the metallic band members. This method permits the nitriding treatment even while the above-described plurality of metallic band members constituting the above-indicated one laminar ring are laminated on each other as in the end product in the form of the laminar ring, as well as has the advantage of improving the efficiency of the nitriding treatment of the metallic band members as described above. Accordingly, the metallic band members which have been subjected to the nitriding treatment need not be disassembled for assembling the end product, providing an advantage of reduced time and cost of manufacture of the end product.

In the method of manufacturing the laminar ring according to the invention of a third embodiment, the above-described gaps are formed by laminating on each other a plurality of metallic band members corresponding to a same layer of said laminar ring of a same circumferential length selected from a plurality of sets of the above-described metallic band members each of which constitutes the above-described laminar ring, the metallic band members of each of the above-described plurality of sets having respective different circumferential lengths, or laminating on each other a plurality of metallic band members of each of at least one set which constitutes the above-described laminar ring such that a circumferential length of the metallic band members increases in a radially inward direction of the metallic band members. This method permits the above-described gaps to be formed by only laminating the metallic band members i.e. without a need of applying an external force to the metallic band members, making it possible to prevent damaging the metallic band members, as well as has the advantage of improving the efficiency of the nitriding treatment of the metallic band members as described above. When one laminar ring is manufactured, the gaps can be formed by simply laminating the metallic band members on each other in the order reversed with respect to the order of lamination of the metallic band members which constitute the laminar ring. In this case, the metallic band members need not be disassembled after the nitriding treatment.

In the method of manufacturing the laminar ring according to the invention of a fourth embodiment, the above-described gaps are formed by laminating on each other a plurality of metallic band members of different circumferential lengths which are selected from the above-described plurality of metallic band members constituting the above-described laminar ring and which are not radially adjacent to each other. This method permits the above-described gaps to be formed by simply laminating the metallic band members on each other, without a need of applying an external force to the metallic band members, making it possible to prevent damaging the metallic band members, as well as has the advantage of improving the efficiency of the nitriding treatment of the metallic band members as described above.

In the method of manufacturing the laminar ring according to the invention of a fifth embodiment, the above-described gaps are formed by laminating on each other a plurality of metallic band members which are selected from the above-described plurality of metallic band members of the different circumferential lengths constituting the above-described laminar ring, and which are odd-numbered or even-numbered as counted from the innermost metallic band member of the laminar ring. This method permits the above-described gaps to be formed by simply laminating the metallic band members, without a need of applying an external force to the metallic band members, making it possible to prevent damaging the metallic band members, as well as has the advantage of improving the efficiency of the nitriding treatment of the metallic band members as described above.

In the method of manufacturing the laminar ring according to the invention of a sixth embodiment, the above-described nitriding treatment step is implemented such that the above-described plurality of metallic band members laminated on each other and supported by the above-described support rollers are rotated by the support rollers during continuous feeding of the above-described transferring platform in the above-described furnace chamber, so that the position of the above-described gaps is moved relative to the metallic band members in the circumferential direction of the metallic band members, whereby the surfaces of the radially intermediate metallic band member or members can be sufficiently nitrided over their entire circumference during the continuous feeding, making it possible to improve the efficiency of the nitriding treatment of the metallic band members.

MODE FOR CARRYING OUT THE INVENTION

Embodiments of the present invention will be described in detail by reference to the drawings. It is to be understood that the drawings showing the embodiments are simplified or transformed as needed, and do not necessarily accurately indicate the dimensions and shapes of individual elements of the embodiments.

Embodiment 1

Figure 1:
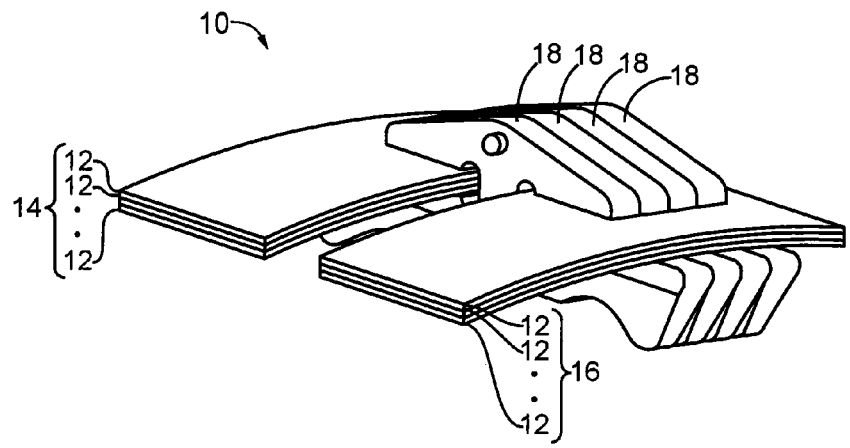
FIG. 1 is a perspective view showing a circumferential portion of a power transmitting belt of a belt-type continuously variable transmission for a vehicle, which is manufactured according to the present invention.

FIG. 1 is the perspective view showing a circumferential portion of a power transmitting belt 10 of a belt-type continuously variable transmission for a vehicle, which is manufactured according to the present invention. The above-described belt-type continuously variable transmission is provided with an input shaft and an output shaft not shown, a driving pulley and a driven pulley not shown, which are integrally disposed on the respective input and output shafts and which have V-grooves the widths of which are variable, and the power transmitting belt 10 engaging the V-grooves of the driving and driven pulleys to transmit a torque between the driving and driven pulleys. The effective diameters of the driving and driven pulleys engaging the power transmitting belt 10 are changed by changing the widths of the V-grooves, to permit a continuous change of a ratio of rotating speeds of the above-described input and output shafts.

As shown in FIG. 1, the above-described power transmitting belt 10 consists of a first laminar ring 14 and a second laminar ring 16 which are disposed in parallel with each other and each of which is constituted by a plurality of annular endless metallic band members 12 having respective different circumferential lengths and laminated on each other, and a plurality of elements 18 in the form of metallic plates arranged in a direction of their thickness along an annulus of the first and second laminar rings 14, 16. The above-described first laminar ring 14 and second laminar ring 16 (hereinafter referred to as "laminar ring 14 (16)" unless otherwise specified) are provided to support the plurality of elements 18 arranged along the arc. Each laminar ring 14 (16) according to the present embodiment is constituted by nine annular metallic band members consisting of a first metallic band member $12_1$ through a ninth metallic band member $12_9$ which are tightly laminated on each other over their entire circumference and the circumferential lengths of which are adjusted to increase in the radially outward direction. It is noted that FIG. 1 does not exactly show the laminar ring 14 (16) constituted by the nine metallic band members consisting of the first through ninth metallic band members $12_1$-$12_9$ as described above, for brevity's sake.

Figure 2:
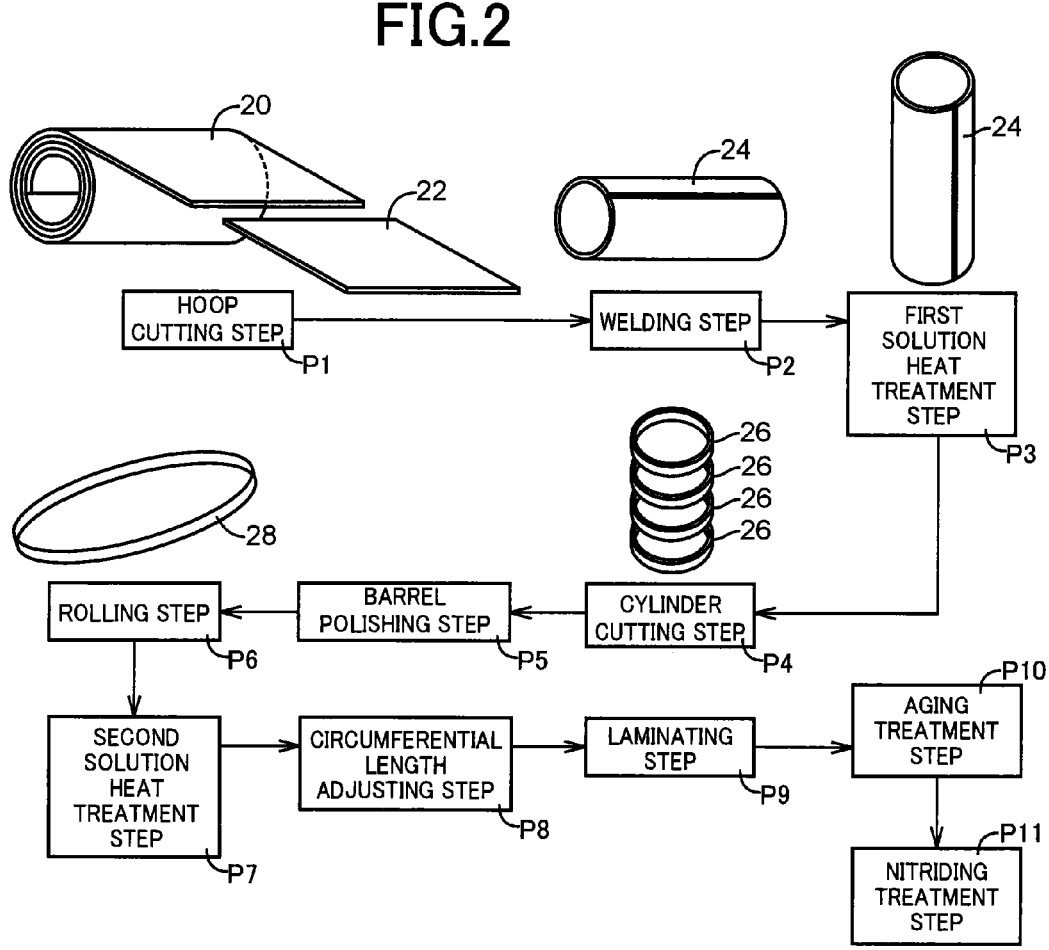
FIG. 2 is a flow chart for explaining steps of manufacturing a laminar ring shown in FIG. 1.

FIG. 2 is the flow chart for explaining steps of manufacturing the laminar ring 14 (16) shown in FIG. 1. Referring to this view of FIG. 2, a method of manufacturing the laminar ring 14 (16) will be described.

As shown in FIG. 2, a hoop cutting step P1 is initially implemented to cut a hoop or band steel 20 such as a maraging steel or stainless steel, to obtain a steel sheet 22 having a predetermined length. For example, the hoop or band steel 20 is a maraging alloy steel including 17-19% by volume of nickel, 7-13% by volume of cobalt, 3.5-4.5% by volume of molybdenum, 0.3-1% by volume of titanium, 0.05-0.15% by volume of aluminum, and no more than 0.03% by volume of carbon.

Then, a welding step P2 is implemented to weld together opposite ends of the thus obtained steel sheet 22 to form a cylindrical member 24.

Then, a first solution heat treatment step P3 is implemented to subject the cylindrical member 24 to a first solution heat treatment, for even distribution of hardness of the cylindrical member 24 the welded portion of which has been partially hardened due to heat of welding in the welding step P2. In this embodiment, the first solution heat treatment is performed, for instance, to heat the cylindrical member 24 to a temperature not lower than a point at which the steel alloy is melted into a solid solution, to keep the cylindrical member 24 at this temperature for a sufficient length of time, and to then rapidly cool the cylindrical member 24.

Subsequently, a cylinder cutting step P4 is implemented to cut the cylindrical member 24 the hardness of which has been evenly distributed, at a predetermined pitch in its axial direction, in a plane perpendicular to the axial direction, to form a plurality of short cylindrical members 26.

Then, a barrel polishing step P5 is implemented to put at least a part of the above-indicated short cylindrical members 26 in a suitable rotating or vibrating container at one time, or at a predetermined time interval with polishing agent, for polishing the short cylindrical members 26, so that the cut surfaces of the short cylindrical members 26 are de-burred and smoothed.

Subsequently, a rolling step P6 is implemented to roll each of the thus polished short cylindrical members 26 into an annular member 28 having a predetermined thickness. In the present embodiment, the short cylindrical member 26 is supported in rolling contact with a pair of mutually parallel rotating rollers not shown, so as to be rotated in its circumferential direction by the rotating rollers, while at the same time squeezed at a circumferential portion thereof in its direction of thickness, by a pair of presser rollers not shown, which are disposed between the pair of rotating rollers whereby the short cylindrical member 26 is rolled into the annular member 28 having the predetermined thickness. For preventing slackness or removal of the short cylindrical member 26, the above-indicated pair of rotating rollers are moved relative to and away from each other, to give a suitable tension to the short cylindrical member 26 in its circumferential direction, according to a force of the relative movement of the pair of rotating rollers.

Then, a second solution heat treatment step P7 is implemented to subject the annular member 28 to a second solution heat treatment, for restoring the metallic structure of the annular member 28 which has been deformed due to the rolling force in the rolling step P6. In this embodiment, the second solution heat treatment is performed, for instance, to heat the annular member 28 to a temperature not lower than a point at which the steel alloy is melted into a solid solution, to keep the annular member 28 at this temperature for a sufficient length of time, and to then rapidly cool the annular member 28.

Subsequently, a circumferential length adjusting step P8 is implemented to adjust the circumferential lengths of the nine annular members 28 subjected to the above-described second solution heat treatment, to respective predetermined circumferential lengths of the first through ninth metallic band members $12_1$-$12_9$ (shown in FIG. 5 referred to later). Namely, the first through ninth metallic band members $12_1$-$12_9$ are obtained from the corresponding ones of the nine annular members 28 subjected to the above-described second solution heat treatment. In the present embodiment, each annular member 28 is supported in rolling contact with a pair of mutually parallel rotating rollers not shown, so as to be rotated in its circumferential direction by the rotating rollers, while at the same time tensioned in its circumferential direction by a relative movement of the rotating rollers away from each other, so that the circumferential length of the annular member 28 is adjusted to the predetermined circumferential length to form the corresponding one of the first through ninth metallic band members $12_1$-$12_9$.

Then, a laminating step P9 is implemented to tightly laminate the nine metallic band members $12_1$-$12_9$ of the different circumferential lengths on each other over their entire circumference, such that the circumferential length of the metallic band members $12_1$-$12_9$ which constitute an end product in the form of one laminar ring 14 (16) increases in the radially outward direction.

Subsequently, an aging treatment step P10 is implemented to subject the first through ninth metallic band members $12_1$-$12_9$ laminated on each other as described above, to an aging treatment. In this embodiment, the aging treatment step is performed to heat the first through ninth metallic band members $12_1$-$12_9$ to a predetermined temperature and to keep these metallic band members at this temperature for a sufficient length of time, while a gap S (indicated in FIG. 5 referred to later) is formed between circumferential portions of the adjacent ones of the first through ninth metallic band members $12_1$-$12_9$ laminated on each other, such that the position of the gap S is moved relative to the metallic band members in the circumferential direction of the metallic band members. The first through ninth metallic band members $12_1$-$12_9$ are then rapidly cooled.

Figure 3:
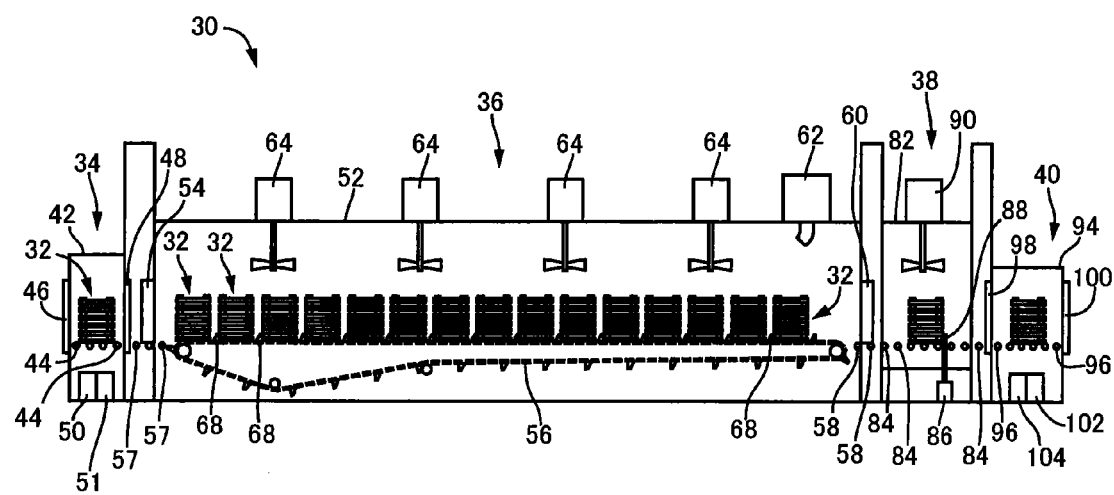
FIG. 3 is a view showing a continuous furnace used for performing a nitriding treatment in a nitriding treatment step of FIG. 2, and an aging treatment.

Then, a nitriding treatment step P11 is implemented to subject the first through ninth metallic band members $12_1$-$12_9$ laminated on each other as described above, to an nitriding treatment, to form the laminar ring 14 (16). In this embodiment, the nitriding treatment step is implemented to move the first through ninth metallic band members $12_1$-$12_9$ through a continuous furnace 30 from a pre-vacuum-purging chamber portion 34 (shown in FIG. 3 referred to later) whose atmosphere has been replaced by nitrogen by evacuation, into a heating chamber portion 36 (indicated in FIG. 3 referred to later) whose atmosphere has been adjusted to include a nitriding gas such as nitrogen and an ammonium gas by a predetermined concentration, while the gap S (indicated in FIG. 5 referred to later) is formed between the circumferential portions of the adjacent ones of the first through ninth metallic band members $12_1$-$12_9$ laminated on each other, such that the position of the plurality of gaps S is moved relative to the metallic band members in the circumferential direction of the metallic band members, whereby the nitrogen is permitted to diffuse or flow into the surface portions of the first through ninth metallic band members $12_1$-$12_9$ while the metallic band members are kept in the atmosphere including the above-indicated nitriding gas of the predetermined concentration for the predetermined length of time. In the present embodiment, the nitriding treatment follows the above-described aging treatment. In the nitriding treatment step P11, the continuous furnace (nitriding treatment furnace) 30 shown in FIG. 3 is used to perform the nitriding treatment while the position of the above-indicated gaps S is moved relative to the metallic band members in the circumferential direction. It is noted that a continuous furnace of a construction similar to that of the above-indicated continuous furnace 30 is used in the aging treatment step P10, to perform the aging treatment while the position of the above-indicated gaps S is moved relative to the metallic band members in the circumferential direction, for preventing deformation of the metallic band members 12 due to heat generated in the aging treatment. The continuous furnace 30 indicated above will be described in detail.

FIG. 3 is the view showing the tunnel-type continuous furnace 30 used for performing the above-described nitriding treatment in the nitriding treatment step P11 of FIG. 2. Within this continuous furnace 30, a transferring jig 32 carrying a plurality of sets (five sets in this embodiment) of the above-described first through ninth metallic band members $12_1$-$12_9$ laminated on each other is transferred. As shown in FIG. 3, the continuous furnace 30 is provided with the pre-vacuum-purging chamber portion 34, the heating chamber portion 36, a cooling chamber portion 38 and a post-vacuum-purging chamber portion 40, which are arranged in this order of description from an inlet side of the continuous furnace 30.

The above-indicated pre-vacuum-purging chamber portion 34 is provided with: a plurality of rotary drive rollers 44 rotated to feed the transferring jig 32 into a furnace chamber 42 of the pre-vacuum-purging chamber portion 34 and to feed the transferring jig 32 from the furnace chamber 42 into the heating chamber portion 36: an inlet door 46 operable to open an inlet of the furnace chamber 42 upon feeding of the transferring jig 32 into the furnace chamber 42 and to completely close the above-indicated inlet upon feeding of the transferring jig 32 into the heating chamber portion 36; an outlet door 48 operable to open an outlet of the furnace chamber 42 upon feeding of the transferring jig 32 into the heating chamber portion 36 and to completely close the above-indicated outlet upon feeding of the transferring jig 32 into the furnace chamber 42; a vacuum pump 50 operable to evacuate the furnace chamber 42; and a nitriding gas supply device 51 operable to supply the above-indicated nitriding gas into the furnace chamber 42 so that the atmosphere within the furnace chamber 42 includes the nitriding gas by the predetermined concentration. Before the transferring jig 32 is fed into the furnace chamber 42 of the pre-vacuum-purging chamber portion 34 constructed as described above, the inlet door 46 is opened, and the rotary drive rollers 44 are rotated to feed the transferring jig 32 into the furnace chamber 42. Then, the inlet door 46 is completely closed to hold the furnace chamber 42 in a completely air-tight state, and the vacuum pump 48 is subsequently operated to evacuate the furnace chamber 42. Then, the nitriding gas supply device 51 is operated to supply the nitriding gas into the furnace chamber 42, so as to raise the pressure within the furnace chamber 42 to a level equal to that within a furnace chamber 52 of the heating chamber portion 36, for example, to a level equal to the atmospheric pressure plus 10-100 [kPa]. Subsequently, the outlet door 48 is opened for communication of the furnace chamber 42 with the furnace chamber 52 of the heating chamber portion 36, and the rotary drive rollers 44 are rotated to feed the transferring jig 32 into the heating chamber portion 36. Then, the outlet door 48 is completely closed. This series of operations are performed continuously at a predetermined time interval, to successively feed the transferring jigs 32 into the heating chamber portion 36.

The above-indicated heating chamber portion 36 is provided with: an inlet door 54 operable to open an inlet of the furnace chamber 52 upon feeding of each transferring jig 32 from the pre-vacuum-purging chamber portion 34 into the furnace chamber 52 of the heating chamber portion 36; a chain-driven conveyor 56 rotated to receive the transferring jigs 32 thereon successively fed into the furnace chamber 52 at the predetermined time interval, and to feed the transferring jigs 32 from the inlet to the outlet of the furnace chamber 52, during a predetermined length of time; a plurality of rotary drive rollers 57 rotated to bring the transferring jigs 32 fed from the pre-vacuum-purging chamber portion 34, onto the conveyor 56; a plurality of rotary drive rollers 58 rotated to feed the transferring jigs 32 fed by the conveyor 56 to an outlet of the furnace chamber 52, into the cooling chamber portion 38; an outlet door 60 operable to open the above-indicated outlet of the furnace chamber 52 upon feeding of the transferring jigs 32 into the cooling chamber portion 38; a nitriding gas supply device 62 operable to supply the above-indicated nitriding gas into the furnace chamber 52 so that the atmosphere within the furnace chamber 52 includes the nitriding gas by the predetermined concentration; and a plurality of agitators 64 operable to agitate the atmosphere within the furnace chamber 52. The above-described conveyor 56 is provided with a plurality of anti-backing devices 68 arranged at a predetermined spacing pitch in the circumferential direction, to prevent backward movements of the transferring jigs 32 placed on the conveyor 56. The nitriding gas supply device 62 and the agitators 64 are operated so that the atmosphere within the furnace chamber 52 of the heating chamber portion 36 constructed as described above includes the above-indicated nitriding gas by the predetermined concentration. Described more specifically, the furnace chamber 52 is continuously supplied with constant flows of nitrogen and an ammonium gas while at the same time an exhaust valve not shown disposed at a gas exhaust outlet is controlled to keep the pressure within the furnace chamber 52 at the level equal to the atmospheric pressure plus 10-100[kPa]. It is to be understood that the above-described furnace chamber 52 corresponds to a furnace chamber having the predetermined atmosphere controlled according to the present invention. After the inlet door 54 is opened for communication of the furnace chamber 52 with the furnace chamber 42 of the pre-vacuum-purging chamber portion 34, the rotary drive rollers 57 are rotated to feed each transferring jig 32 from the pre-vacuum-purging chamber portion 34 into the furnace chamber 52. Then, the transferring jig 32 fed into the furnace chamber 52 is fed by the conveyor 56 toward the outlet of the furnace chamber 52, while at the same time the inlet door 54 is closed. When the leading transferring jig 32 on the conveyor 56 has arrived at the outlet of the furnace chamber 52, the outlet door 60 is opened, and the rotary drive rollers 58 are rotated to feed that transferring jig 32 from the heating chamber portion 36 into the cooling chamber portion 38. In the furnace chamber 52, there are provided a plurality of concentration meters (not shown) for detecting the concentration of the nitriding gas, so that the atmosphere within the furnace chamber 52 is controlled so as to include the nitriding gas by the predetermined concentration, with the nitridding gas supply device 62 and agistors 64 being controlled on the basis of the concentration of the nitriding gas within the furnace chamber 52 detected by the concentration meters even during operations of the various devices described above. This series of operations are performed continuously at a predetermined time interval, to perform the nitriding treatment of the first through ninth metallic band members $12_1$-$12_9$ carried by the transferring jigs 32 being continuously fed through the furnace chamber 52 which has the controlled predetermined atmosphere described above.

Figure 4:
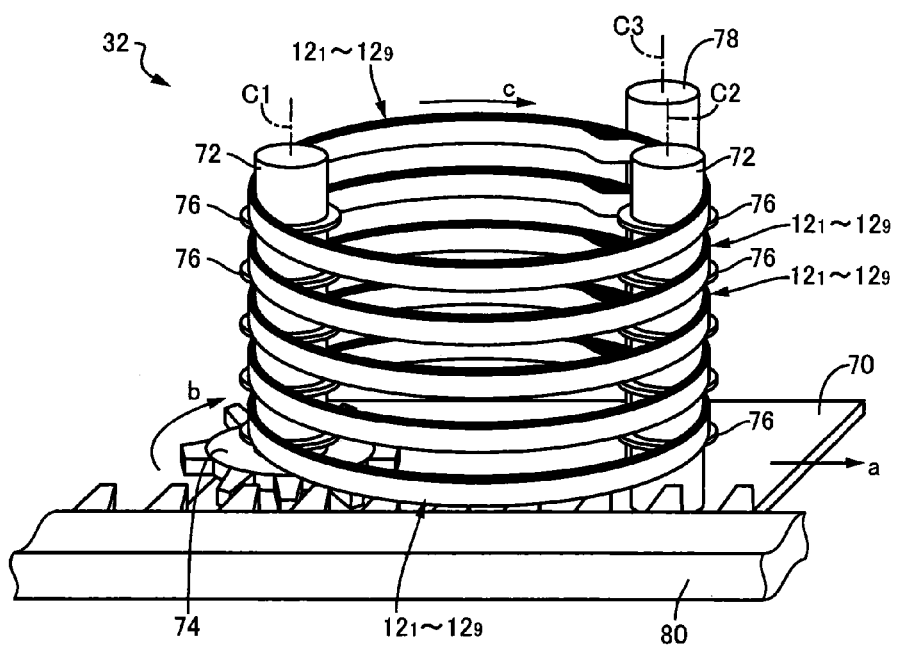
FIG. 4 is a view showing a transferring jig which is continuously fed through a furnace chamber of a heating chamber portion, as shown in FIG. 3, and which carries five sets of a first metallic band member through a ninth metallic band member which are laminated on each other.

FIG. 4 is the view showing the transferring jig 32 which is continuously fed through the furnace chamber 52 of the heating chamber portion 36 shown in FIG. 3 and which carries the five sets of the first through ninth metallic band members $12_1$-$12_9$ which are laminated on each other. As shown in FIG. 4, the transferring jig 32 is provided with: a planar transferring platform 70 to be continuously fed in a feeding direction indicated by an arrow "a" through the various furnace chambers such as the furnace chamber 52 having the controlled predetermined atmosphere such as predetermined density of nitriding gas, by the conveyor 56 and the rotary drive rollers provided in the furnace chambers; a pair of mutually parallel support rollers 72 which are disposed on the transferring platform 70 rotatably about respective axes C1 and C2 perpendicular to an upper surface of the transferring platform 70 and which engage the above-indicated sets of the first through ninth metallic band members $12_1$-$12_9$ laminated on each other, to support the metallic band members $12_1$-$12_9$; and a gear 74 which is formed integrally with and radially outwardly of a lower portion of one of the support rollers 72 and which is rotatable about the axis C1 relative to the transferring platform 70. Each of the above-described pair of support rollers 72 has a plurality of (five in this embodiment) radially extending flanges 76 spaced apart from each other at a predetermined spacing pitch in the direction of the axis C1, C2. Each of the plurality of sets of the first through ninth metallic band members $12_1$-$12_9$ which engage the above-indicated pair of support rollers 72 is held and supported in abutting contact at its lower end face with the corresponding one of the above-indicated flanges 76, which prevent downward movements and removal of the metallic band members on and from the support rollers 72. The transferring jig 32 according to the present embodiment is further provided with a presser roller 78 which is provided on the transferring platform 70 rotatably about an axis C3 perpendicular to an upper surface of the transferring platform 70 and which functions to press the plurality of sets of the first through ninth metallic band members $12_1$-$12_9$ engaging the pair of support rollers 72, locally at a circumferential position of the metallic band members in a radially inward direction of the metallic band members, so that the radial gaps S shown in FIG. 5 referred to later are formed between the circumferential portions of the adjacent ones of the first through ninth metallic band members $12_1$-$12_9$.

Figure 5:
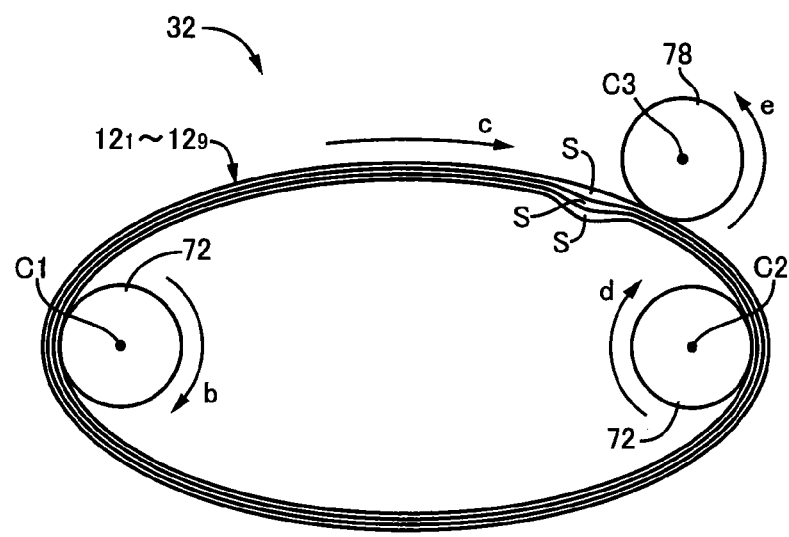
FIG. 5 is a plan view schematically illustrating a pair of support rollers and a presser roller of the transferring jig of FIG. 4, and the first metallic band member through the ninth metallic band member.

FIG. 5 is the plan view schematically illustrating the pair of support rollers 72 and the presser roller 78 of the transferring jig 32 of FIG. 4, and the first metallic band member $12_1$ through the ninth metallic band member $12_9$. In FIG. 5, an arrow "b" indicates a direction of rotation of a driven one of the support rollers 72, and an arrow "c" indicates a direction of rotation of the first through ninth metallic band members $12_1$-$12_9$ by the above-indicated one of the support rollers 72 in their circumferential direction, while arrows "d" and "e" respectively indicate directions of rotation of the other of the support rollers 72 and the presser roller 78 which are held in rolling contact with the respective inner and outer circumferential surfaces of each set of the first through ninth metallic band members $12_1$-$12_9$. As shown in FIG. 5, the gaps S are formed between the circumferential portions of the adjacent metallic band members $12_1$-$12_9$ laminated on each other, which circumferential portions are located on a rearward side of the presser roller 78 as seen in the rotating direction of the metallic band members $12_1$-$12_9$. It is noted that FIG. 5 does not exactly show the set of nine metallic band members consisting of the first through ninth metallic band members $12_1$-$12_9$, for brevity's sake. This is also true to FIGS. 10, 12 and 14 referred to later.

Referring back to FIG. 4, a stationary rack 80 is disposed in the furnace chamber 52 of the above-described heating chamber portion 36, on one side of a transferring portion of the conveyor 56, which transferring portion is located on an upper span of the conveyor 56 to feed the transferring jigs 32. Each transferring jig 32 is fed by the conveyor 56 through the furnace chamber 52 in the feeding direction indicated by the arrow "a", while the gear 74 is held in meshing engagement with the above-indicated rack 80, so that the gear 74 is rotated by the rack 80 in the direction indicated by the arrow "b" during feeding of the transferring jig 32, to thereby apply a torque to the above-indicated one of the support rollers 72 which is formed integrally with the gear 74, whereby that support roller 72 is rotated. It is to be understood that the above-indicated rack 80 corresponds to a stationary engaging member according to this invention, while the above-indicated gear 74 corresponds to a rotary driving member according to the invention. As described above, the plurality of sets of the first through ninth metallic band members $12_1$-$12_9$ engaging the pair of support rollers 72 are fed through the furnace chamber 52 by the conveyor 56 while being rotated in the circumferential direction. During this feeding movement, the above-described gaps S are formed between the circumferential portions of the adjacent metallic band members $12_1$-$12_9$ laminated on each other, which circumferential portions are located on the rearward side of the presser roller 78 as seen in its rotating direction, as described above. Since the metallic band members $12_1$-$12_9$ are moved in their circumferential direction relative to the presser roller 78, the position of the gaps S is moved relative to the metallic band members $12_1$-$12_9$ in the circumferential direction of the metallic band members as the metallic band members are fed through the furnace chamber 52 by the conveyor 56. Accordingly, the nitriding gas can be sufficiently supplied between the adjacent ones of the metallic band members $12_1$-$12_9$ laminated on each other, over their entire circumference, while these metallic band members $12_1$-$12_9$ are fed through the furnace chamber 52.

Referring back to FIG. 3, the above-indicated cooling chamber portion 38 is provided with: a plurality of rotary drive rollers 84 rotated to feed the transferring jigs 32 from the heating chamber portion 36 into a furnace chamber 82 of the cooling chamber portion 38 and to feed the transferring jigs 32 from the furnace chamber 82 into the post-vacuum-purging chamber portion 40; a stopper 88 which is located a position ahead of each transferring jig 32 fed into the furnace chamber 82 in the feeding direction, and is lifted by a cylinder 86 disposed below the rotary drive rollers 84, to prevent a further feeding movement of the transferring jig 32, and is lowered by the cylinder 86 to permit the further feeding movement of the transferring jig 32; and a cooling fan 90 operable to cool the plurality of sets of the metallic band members $12_1$-$12_9$ carried by the transferring jig 32. The transferring jig 32 fed from the heating chamber portion 36 is fed by the rotary drive rollers 84 into the furnace chamber 82 of the cooling chamber portion 38, and the stopper 88 is lifted by the cylinder 86 at the position ahead of the transferring jig 32 fed into the furnace chamber 82, to prevent the further movement of the transferring jig 32 in the feeding direction. Then, the plurality of sets of the metallic band members $12_1$-$12_9$ carried by the transferring jig 32 are rapidly cooled by the cooling fan 90 for a predetermined length of time. Subsequently, the stopper 88 is lowered, and the rotary drive rollers 84 are rotated to feed the transferring jig 32 from the furnace chamber 82. This series of operations are performed continuously at a predetermined time interval to successively feed the transferring jigs 32 from the heating chamber portion 36 into the furnace chamber 82, and to cool the plurality of sets of the metallic band members $12_1$-$12_9$ carried by the transferring jigs 32.

Figure 6:
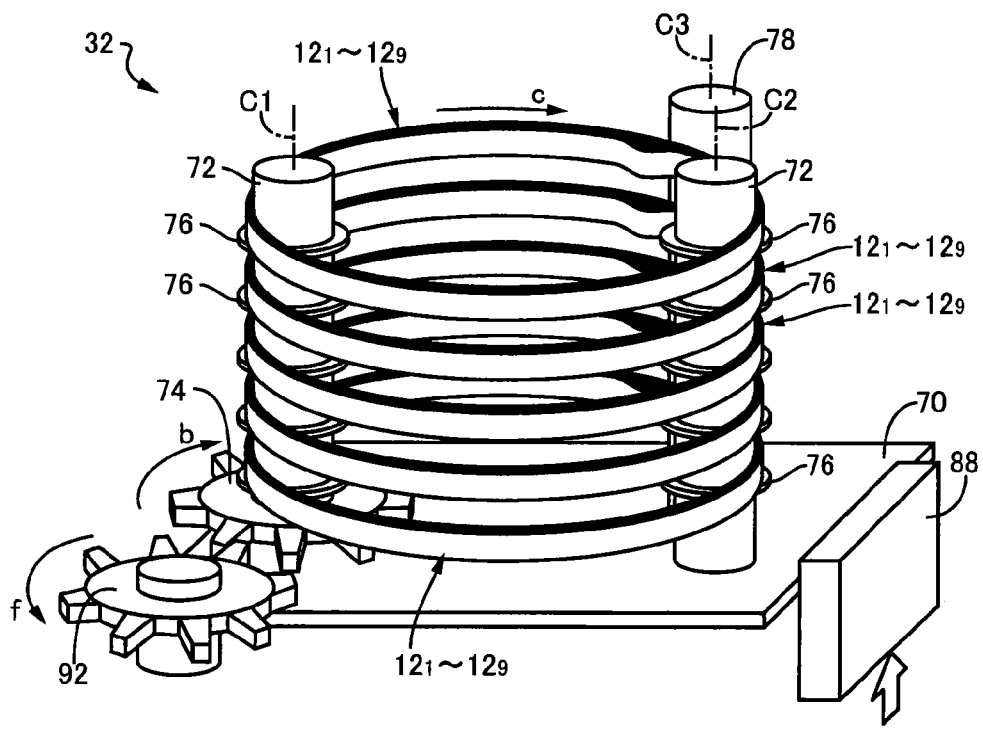
FIG. 6 is a view showing the transferring jig a feeding movement of which is prevented by a stopper in a furnace chamber of a cooling chamber portion of FIG. 3.

FIG. 6 is the view showing the transferring jig 32 the feeding movement of which is prevented by the stopper 88 lifted up by the cylinder 86 in the furnace chamber 82 of the cooling chamber portion 38 of FIG. 3. In the furnace chamber 82 of the above-described cooling chamber portion 38, there is disposed a driving gear 92 which is held in meshing engagement with the gear 74 of the transferring jig 32 the feeding movement of which is prevented by the stopper 88 and which is rotated in a direction indicated by an arrow "f" by an electric motor not shown, for instance. The first through ninth metallic band members $12_1$-$12_9$ carried by the stopped transferring jig 32 are rapidly cooled by the cooling fan 90 while being rotated in the direction indicated by the arrow "c" by the gear 74 of the transferring jig 32 rotated by the above-indicated driving gear 92 in the direction indicated by the arrow "b". During the above-indicated cooling, the position of the gaps S is moved relative to the metallic band members in the circumferential direction, so that a cooling gas can be sufficiently supplied by the cooling fan 90, between the adjacent ones of the first through ninth metallic band members $12_1$-$12_9$ laminated on each other, over their entire circumference.

Referring back to FIG. 3, the above-indicated post-vacuum-purging chamber portion 40 is provided with: a plurality of rotary drive rollers 96 rotated to feed the transferring jig 32 from the cooling chamber portion 38 into a furnace chamber 94 of the post-vacuum-purging chamber portion 40 and to feed the transferring jig 32 from the furnace chamber 94: an inlet door 98 operable to open an inlet of the furnace chamber 94 upon feeding of the transferring jig 32 into the furnace chamber 94 and to completely close the above-indicated inlet upon feeding of the transferring jig 32 from the furnace chamber 94; an outlet door 100 operable to open an outlet of the furnace chamber 94 upon feeding of the transferring jig 32 from the furnace chamber 94 and to completely close the above-indicated outlet upon feeding of the transferring jig 32 into the furnace chamber 94; a vacuum pump 102 operable to evacuate the furnace chamber 94; and a nitriding gas supply device 104 operable to supply the above-indicated nitriding gas into the furnace chamber 94 so that the atmosphere within the furnace chamber 94 includes the nitriding gas by the predetermined concentration. Before the transferring jig 32 is fed into the furnace chamber 94 of the post-vacuum-purging chamber portion 40 constructed as described above, the inlet door 98 and the outlet door 100 are both closed to hold the furnace chamber 94 in a completely airtight state, and the vacuum pump 102 is operated to evacuate the furnace chamber 94. Then, the nitriding gas supply device 104 is operated to supply the nitriding gas into the furnace chamber 94, so as to raise the pressure within the furnace chamber 94 to a level equal to that within the furnace chamber 52 of the heating chamber portion 36. Subsequently, the inlet door 98 is opened, and the rotary drive rollers 96 are rotated to feed the transferring jig 32 from the heating chamber portion 36 into the post-vacuum-purging chamber portion 40. Then, the inlet door 98 is completely closed to hold the furnace chamber 94 in the completely air-tight state, and the vacuum pump 102 is operated to evacuate the furnace chamber 94. Subsequently, the nitrogen or external atmosphere is introduced into the furnace chamber 94 to restore the pressure therein to the atmospheric pressure. Then, the outlet door 100 is opened, and the rotary drive rollers 96 are rotated to feed the transferring jig 32 from the furnace chamber 94, and the outlet door 100 is completely closed. This series of operations are performed continuously at a predetermined time interval, to successively feed the transferring jigs 32 from the continuous furnace 30.

The method of manufacturing the laminar ring 14 (16) according to the present embodiment comprises the nitriding treatment step P11 of subjecting the first through ninth metallic band members $12_1$-$12_9$ to the nitriding treatment wherein the first through ninth metallic band members $12_1$-$12_9$ are kept in the atmosphere including the nitriding gas by the predetermined concentration, for the predetermined length of time, while the gaps S are formed between the circumferential portions of the adjacent ones of the first through ninth metallic band members $12_1$-$12_9$ laminated on each other such that the position of the above-indicated gaps S is moved relative to the metallic band members $12_1$-$12_9$ in the circumferential direction of the metallic band members $12_1$-$12_9$, to permit nitrogen to diffuse into surface portions of the metallic band members $12_1$-$12_9$, so that the nitriding gas can be sufficiently supplied between the adjacent ones of the metallic band members over their entire circumference, to permit the surface portions of the metallic band members $12_1$-$12_9$ to be sufficiently nitrided, even when the nitriding treatment is performed while the metallic band members $12_1$-$12_9$ are laminated on each other, making it possible to increase the number of the metallic band members 12 that can be nitrided at one time, and improve efficiency of the nitriding treatment of the metallic band members 12. For example, the present method permits the nitriding treatment of a comparatively large number of the metallic band members 12 at one time, by using the continuous furnace 30 having a comparatively small size, and accordingly has an advantage of a reduced cost of manufacture of the laminar ring.

The present embodiment is further configured such that the nitriding treatment of the first through ninth metallic band members $12_1$-$12_9$ is performed while these metallic band members $12_1$-$12_9$ constituting one laminar ring 14 (16) are laminated on each other as in the end product in the form of the laminar ring, so that the metallic band members 12 which have been laminated and subjected to the nitriding treatment need not be disassembled for assembling the end product, providing an advantage of reduced time and cost of manufacture of the end product.

The method of manufacturing the laminar ring 14 (16) according to the present embodiment is further characterized in that the nitriding treatment step P11 is implemented such that the first through ninth metallic band members $12_1$-$12_9$ laminated on each other and supported by the pair of support rollers 72 are rotated by the support rollers 72 during the continuous feeding of the transferring jig 32 in the furnace chamber 52, so that the position of the gaps S formed between the adjacent metallic band members is moved relative to the metallic band members in the circumferential direction of the metallic band members, whereby the surfaces of the radially intermediate metallic band members $12_2$-$12_8$ can be sufficiently nitrided over their entire circumference during the continuous feeding, making it possible to improve the efficiency of the nitriding treatment of the metallic band members 12.

Figure 7:
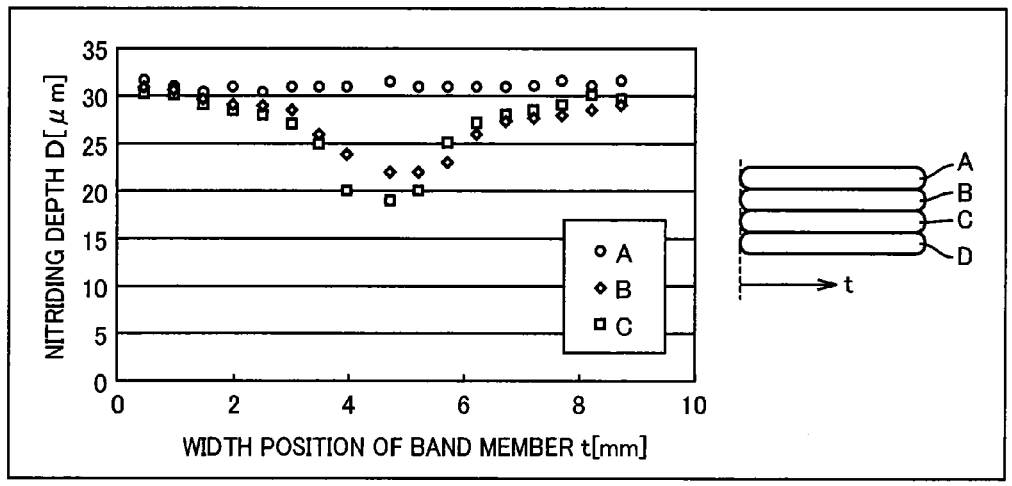
FIG. 7 is a view showing nitriding depths of the radially outermost metallic band member, the metallic band member radially inwardly adjacent to the outermost metallic band member, and the metallic band member radially inwardly adjacent to the latter metallic band member when the plurality of metallic band members of one laminar ring which have the different circumferential lengths and which are merely tightly laminated on each other such that the circumferential length increases in the radially outward direction are subjected to the nitriding treatment, the nitriding depths corresponding to different width positions of each metallic band member from one end thereof.

FIG. 7 is the view showing nitriding depths D [μm] of the radially outermost metallic band member A, the metallic band member B radially inwardly adjacent to the outermost metallic band member A, and the metallic band member C radially inwardly adjacent to the latter metallic band member B when the plurality of metallic band members A-D of one laminar ring 14 (16) which have the different circumferential lengths and which are merely tightly laminated on each other such that the circumferential length increases in the radially outward direction are subjected to the nitriding treatment, the nitriding depths D corresponding to different width positions t of each metallic band member from one end thereof. As indicated in FIG. 7, the niriding depths D of the radially intermediate metallic band members B and C are insufficiently low in their relatively intermediate width positions, due to an insufficient supply of the nitriding gas between the adjacent metallic band members A-D where the nitriding treatment is performed while the plurality of metallic band members A-D are merely tightly laminated on each other.

Embodiment 2

Other embodiments of this invention will be described next. In the embodiments described below, the same reference signs will be used to identify the elements that are identical with those in the preceding embodiment, and the description of these elements is omitted.

Figure 8:
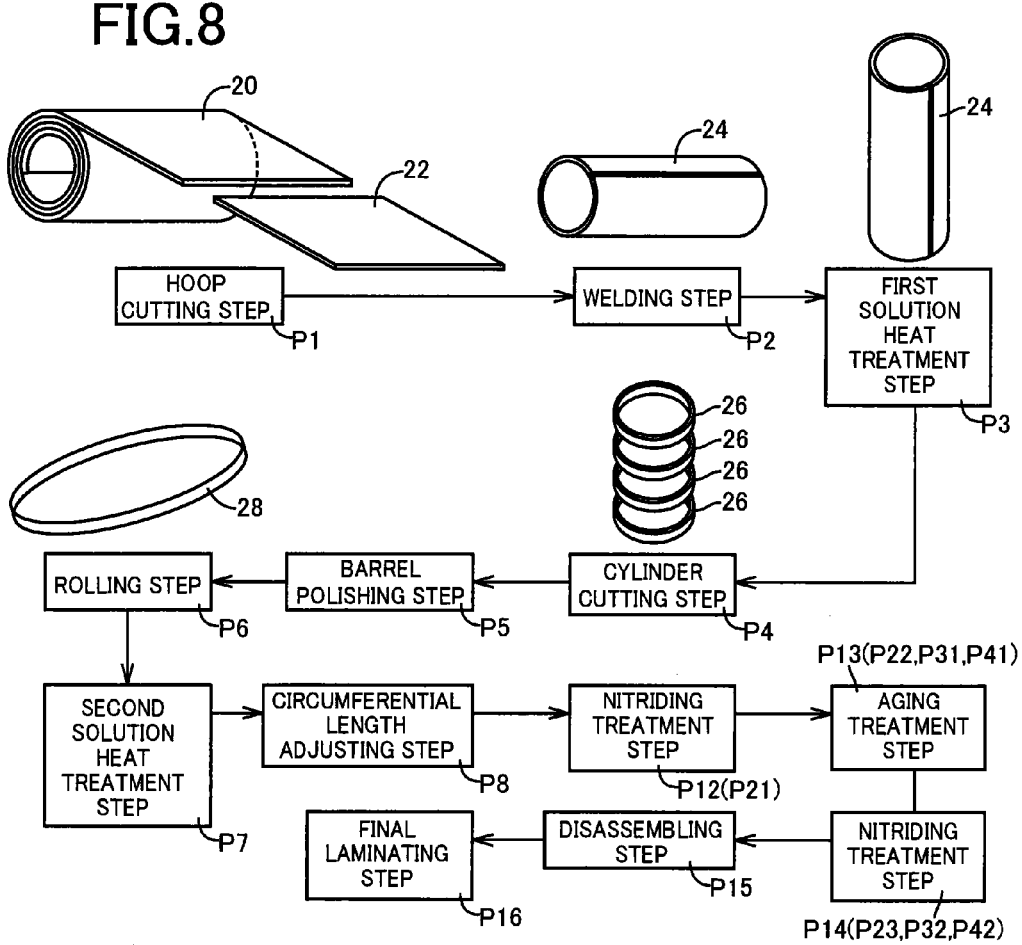
FIG. 8 is a flow chart for explaining steps of manufacturing a laminar ring according to another embodiment of this invention.

FIG. 8 is the flow chart for explaining steps of manufacturing the laminar ring 14 (16) according to another embodiment of this invention. The method of manufacturing the laminar ring 14 (16) will be described by reference to the flow chart of FIG. 8. It is noted that the same reference signs as used in the flow chart of FIG. 2 according to the previously described first embodiment will be used to identify the same steps.

In a laminating step P12 in the flow chart of FIG. 8, the metallic band members of the same circumferential length corresponding to the same layer of the laminar ring, selected from a plurality of sets of the first through ninth metallic band members $12_1$-$12_9$ which constitute respective laminar rings 14 (16) (e.g. respective ten laminar rings in this embodiment) shown in FIG. 1 are laminated on each other. Alternatively, the first through ninth metallic band members $12_1$-$12_9$ of each of at least one set constituting a corresponding one of at least one laminar ring 14 (16) are laminated on each other such that the circumferential length of the metallic band members $12_1$-$12_9$ increases in the radially inward direction of the metallic band members.

In an aging treatment step P13 and a nitriding treatment step P14, the plurality of metallic band members 12 laminated on each other as described above are subjected to the aging treatment and the nitriding treatment. The aging treatment step P13 and the nitriding treatment step P14 in the present embodiment are identical with the aging treatment step P10 and the nitriding treatment step P11 in the above-described first embodiment, regarding the construction and operations of the continuous furnace 30, and the aging and nitriding treatments performed with respect to the metallic band members 12 being transferred through the continuous furnace 30, but are different from the aging and nitriding treatment steps P10, P11, regarding the construction of a transferring jig 110 (shown in FIG. 9 referred to below) used to carry the above-described plurality of metallic band members 12 laminated on each other, and the number of the metallic band members 12 carried by the transferring jig 110.

Figure 9:
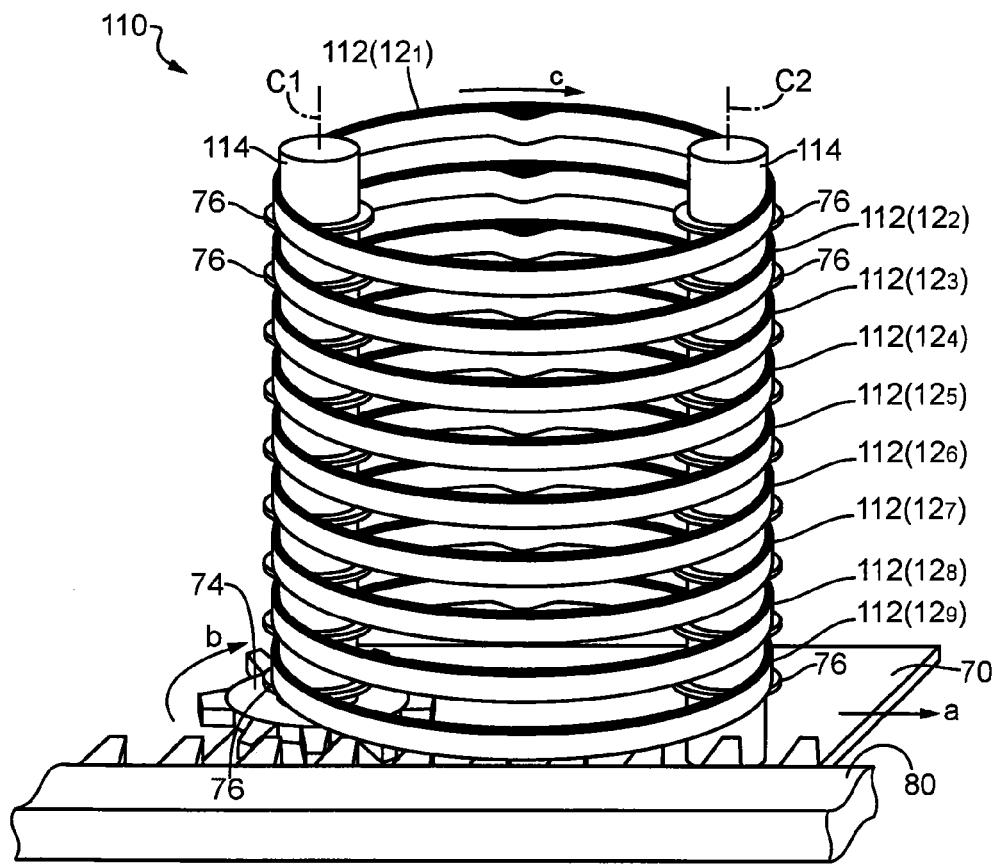
FIG. 9 is a view showing a transferring jig carrying nine laminar members each of which consists of the metallic band members of the same circumferential length which are laminated on each other in the laminating step of FIG. 8.

FIG. 9 is the view showing the transferring jig 110 used according to this embodiment, which carries nine laminar members 112 each of which consists of the plurality of metallic band members 12 laminated on each other in the laminating step P12 of FIG. 8. Each of the laminar members 112 consists of the ten metallic band members $12_1$, $12_2$, $12_3$, $12_4$, $12_5$, $12_6$, $12_7$, $12_8$ or $12_9$ laminated on each other in the laminating step P12. As shown in FIG. 9, the transferring jig 110 is provided with: a pair of mutually parallel support rollers 114 which are provided on the transferring platform 70 rotatably about respective axes C1 and C2 perpendicular to the upper surface of the transferring platform 70 and which engage the above-indicated nine laminar members 112, to support the laminar members 112; and the gear 74 which is formed integrally with and radially outwardly of the lower portion of one of the support rollers 114 and which is rotatable about the axis C1 relative to the transferring platform 70. Each of the above-described pair of support rollers 114 has the nine radially extending flanges 76 spaced apart from each other at a predetermined spacing pitch in the direction of the axis C1, C2. Each of the nine laminar members 112 which engage the above-indicated pair of support rollers 114 is held and supported in abutting contact at its lower end face with the corresponding one of the above-indicated flanges 76, which prevent a downward movement and removal of the laminar members 112.

Figure 10:
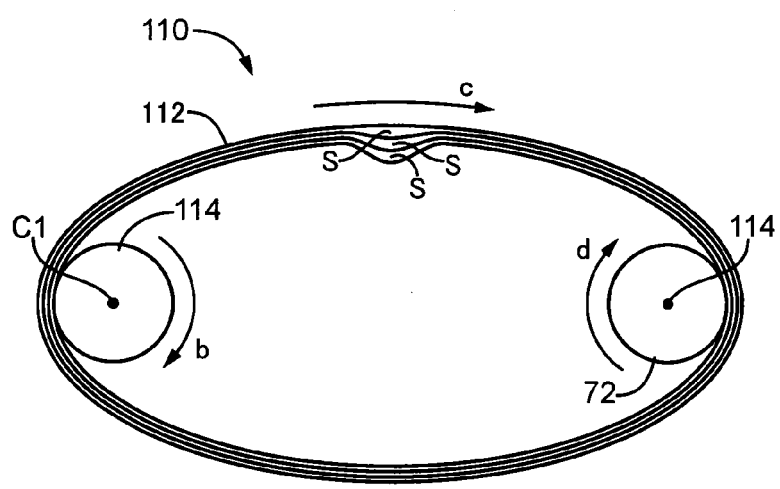
FIG. 10 is a plan view schematically illustrating a pair of support rollers of the transferring jig of FIG. 9, and the laminar member.

FIG. 10 is the plan view schematically illustrating the pair of support rollers 114 of the transferring jig 110 of FIG. 9, and one of the laminar members 112. In FIG. 10, an arrow "b" indicates a direction of rotation of a driven one of the support rollers 114, and an arrow "c" indicates a direction of rotation of the laminar member 112 by the above-indicated one of the support rollers 114 in their circumferential direction, while an arrow "d" indicates a direction of rotation of the other of the support rollers 114 which is held in rolling contact with the inner circumferential surface of the laminar member 112 rotated as described above. As shown in FIG. 10, the radial gaps S are formed between the circumferential portions of the adjacent metallic band members of the laminar member 112, since the metallic band members of the laminar member 112 engaging the pair of support rollers 114 have the same circumferential length, or respective different circumferential lengths such that the circumferential length increases in the radially inward direction of the metallic band members. For instance, the circumferential portions at which the gaps S are formed are located on a rearward side of the above-indicated one support roller 114 as seen in the rotating direction of the metallic band members.

Referring back to FIG. 9, the position of the gaps S formed between the circumferential portions of the adjacent metallic band members of the laminar member 112 as shown in FIG. 10 is moved relative to the metallic band members in the circumferential direction of the metallic band members, as the laminar member 112 (transferring jig 110) is fed in the feeding direction indicated by the arrow "a" by the conveyor 56 through the furnace chamber 52. Accordingly, the nitriding gas can be sufficiently supplied via the gaps S between the adjacent ones of the plurality of metallic band members 12 laminated on each other, over their entire circumference, while the laminar member 112 consisting of the metallic band members 12 is fed through the furnace chamber 52.

Referring back to FIG. 8, a disassembling step P15 is implemented to disassemble the nine laminar members 112 carried by the transferring jig 110 and subjected to the nitriding and aging treatments, into the mutually separate first through ninth metallic band members $12_1$-$12_9$.

In a final laminating step P16, the first through ninth metallic band members $12_1$-$12_9$ obtained in the disassembling step described above are tightly laminated on each other such that the circumferential length increases in the radially outward direction of the metallic band members, as in the end product, whereby the laminar rings 14 (16) are manufactured as the end product.

The present embodiment is identical with the previously described first embodiment, except for those aspects described above. The method of manufacturing the laminar ring 14 (16) according to the present embodiment comprises the nitriding treatment step P14 of subjecting the above-described metallic band members 12 to the nitriding treatment wherein the metallic band members 12 are kept in the atmosphere including the nitriding gas by the predetermined concentration, for the predetermined length of time, while the gaps S are formed between the circumferential portions of the adjacent ones of the metallic band members 12 of the laminar members 112 laminated on each other such that the position of the above-indicated gaps S is moved relative to the metallic band members 12 in the circumferential direction of the metallic band members 12, to permit nitrogen to diffuse into surface portions of the metallic band members 12, so that the nitriding gas can be sufficiently supplied between the adjacent ones of the metallic band members 12 over their entire circumference, to permit surface portions of the metallic band members 12 to be sufficiently nitrided, even when the nitriding treatment is performed while the metallic band members 12 are laminated on each other, making it possible to increase the number of the metallic band members 12 that can be nitrided at one time, and improve efficiency of the nitriding treatment of the metallic band members 12, as in the first embodiment.

The method of manufacturing the laminar ring 14 (16) according to the present embodiment has the following advantage in addition to the advantage described above. Namely, in the nitriding treatment step P14, the gaps S are formed by laminating on each other the metallic band members of the same circumferential length, corresponding to the same layer of the laminar ring, selected from a plurality of sets of the first through ninth metallic band members $12_1$-$12_9$ which constitute the respective laminar rings 14 (16), or alternatively laminating on each other the metallic band members $12_1$-$12_9$ of each of at least one set which constitutes a corresponding one of at least one laminar ring 14 (16) such that the circumferential length of the metallic band members increases in the radially inward direction of the metallic band members. This method permits the gaps S to be formed by simply laminating the metallic band members on each other, without a need of using the presser roller 78 to apply an external force to the metallic band members, making it possible to prevent damaging the metallic band members 12. When the first through ninth metallic band members $12_1$-$12_9$ of one set are laminated on each other, so as to form the gaps, the metallic band members are laminated such that the circumferential length increases in the radially inward direction of the metallic members, that is, in the order reversed with respect to the order of lamination of the metallic band members which constitute the laminar ring. In this case, the metallic band members 12 need not be disassembled and reassembled after the nitriding treatment.

Embodiment 3

In the method of manufacturing the above-described laminar ring 14(16) according to the present embodiment, a laminating step P21 shown in FIG. 8 is implemented to laminate on each other the odd-numbered metallic band members as counted from the innermost metallic band members, which odd-numbered metallic band members are selected from the first through ninth metallic band members $12_1$-$12_9$ constituting one laminar ring 14 (16), namely, to laminate the first metallic band member $12_1$, third metallic band member $12_3$, fifth metallic band member $12_5$, seventh metallic band member $12_7$ and ninth metallic band member $12_9$ on each other. Further, the laminating step P21 is implemented to laminate on each other the even-numbered metallic band members as counted from the innermost metallic band member, which even-numbered metallic band members are selected from the first through ninth metallic band members $12_1$-$12_9$ constituting one laminar ring 14 (16), namely, to laminate the second metallic band member $12_2$, fourth metallic band member $12_4$, sixth metallic band member $12_6$ and eighth metallic band member $12_8$ on each other. The above-described first metallic band member $12_1$, third metallic band member $12_3$, fifth metallic band member $12_5$, seventh metallic band member $12_7$ and ninth metallic band member $12_9$ are the metallic band members of the first through ninth metallic band members $12_1$-$12_9$, which are not radially adjacent to each other. Similarly, the above-described second metallic band member $12_2$, fourth metallic band member $12_4$, sixth metallic band member $12_6$ and eighth metallic band member $12_8$ are the metallic band members of the first through ninth metallic band members $12_1$-$12_9$, which are not radially adjacent to each other.

In an aging treatment step P22 and a nitriding treatment step P23, the plurality of metallic band members 12 laminated on each other as described above are subjected to the aging treatment and the nitriding treatment. The aging treatment step P22 and the nitriding treatment step P23 in the present embodiment are different from the aging treatment step P13 and the nitriding treatment step P14 in the above-described second embodiment, regarding the construction of a transferring jig 120 (shown in FIG. 11 referred to below) used to carry the above-described plurality of metallic band members 12 laminated on each other, and the number of the metallic band members 12 carried by the transferring jig 120.

Figure 11:
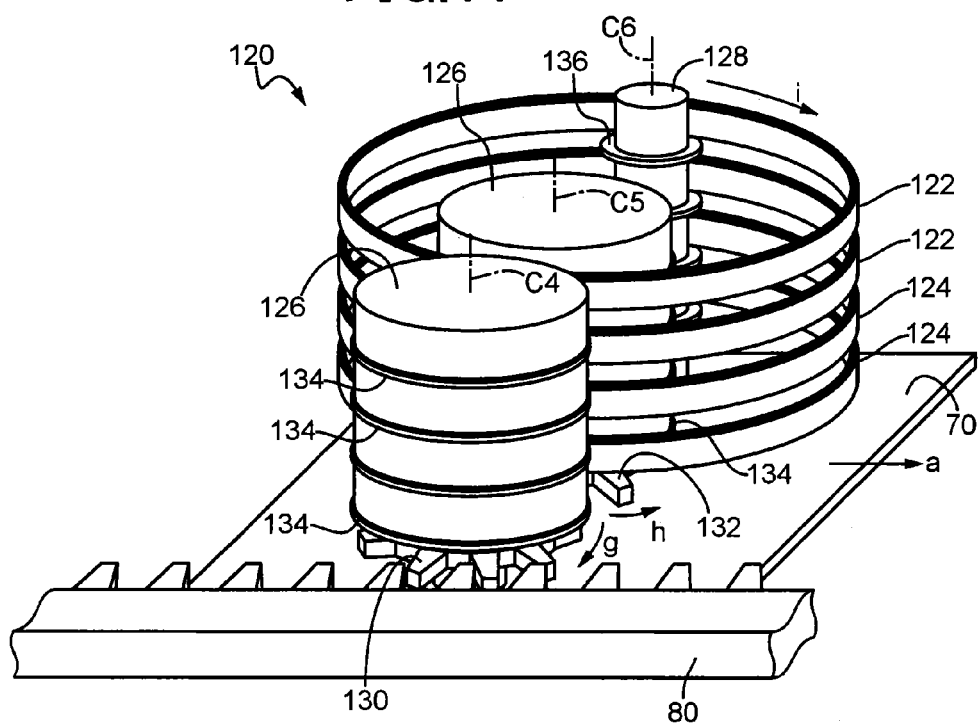
FIG. 11 is a view showing a transferring jig carrying two laminar members each consisting of the first, third, fifth, seventh and ninth metallic band members laminated on each other in the laminating step of FIG. 8 of a method of manufacturing a laminar ring according to a further embodiment of this invention, and two laminar members each consisting of the second, fourth, sixth and eighth metallic band members laminated on each other in the same laminating step.

FIG. 11 is the view showing the transferring jig 120 according to this embodiment, which carries two laminar members 122 each consisting of the first, third, fifth, seventh and ninth metallic band members $12_1$, $12_3$, $12_5$, $12_7$, $12_9$ laminated on each other in the laminating step P21, and two laminar members 124 each consisting of the second, fourth, sixth and eighth metallic band members $12_2$, $12_4$, $12_6$, $12_8$ laminated on each other in the same laminating step. As shown in FIG. 11, the transferring jig 120 is provided with: a pair of mutually parallel large-diameter support rollers 126 which are disposed on the transferring platform 70 rotatably about respective axes C4 and C5 perpendicular to the upper surface of the transferring platform 70 and which nip the laminar members 122 and 124 on their inner and outer circumferential surfaces; a small-diameter support roller 128 which is disposed on the transferring platform 70 rotatably about an axis C6 perpendicular to the upper surface of the transferring platform 70 and located on one side of the above-indicated axis C5 remote from the axis C4, and which engages the inner circumferential surface of the laminar members 122, 124, to support the laminar members 122, 124; a driving gear 130 which is formed integrally with and radially outwardly of a lower portion of one of the large-diameter support rollers 126 located on the side of the rack 80, and which is rotatable about the axis C4 relative to the transferring platform 70; and a driven gear 132 which is formed integrally with and radially outwardly of a lower portion of the other large-diameter support roller 126 and which is rotatable about the axis C5 relative to the transferring platform 70 and held in meshing engagement with the above-indicated driving gear 130. It is to be understood that the above-described driving gear 130 corresponds to the rotary driving member according to the invention. Each of the above-described pair of large-diameter support rollers 126 and the small-diameter support roller 128 respectively have four radially extending flanges 134, 136 spaced apart from each other at a predetermined spacing pitch in the direction of the corresponding axes. The four laminar members 122, 124 are held and supported in abutting contact at their lower end face with the corresponding flanges 134, 136, which prevent downward movements and removal of the laminar members 122, 124 on and from the support rollers 126, 128.

Figure 12:
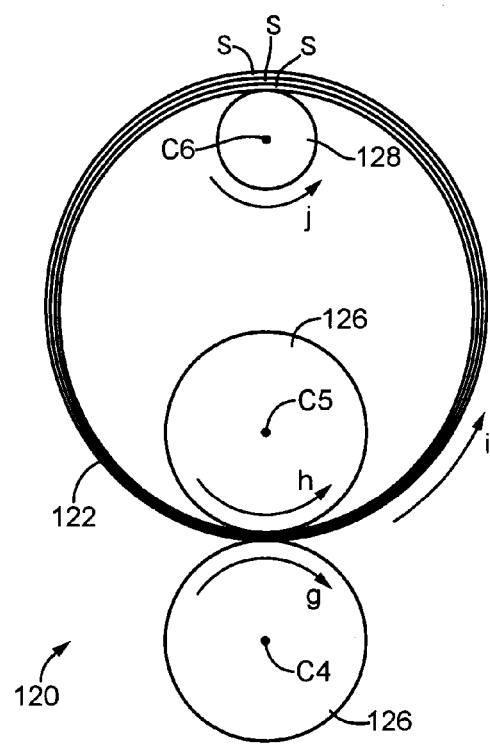
FIG. 12 is a plan view schematically illustrating a pair of large-diameter support rollers and a small-diameter support roller of the transferring jig of FIG. 11, and the laminar member.

FIG. 12 is the plan view schematically illustrating the pair of large-diameter support rollers 126 and the small-diameter support roller 128 of the transferring jig 120 of FIG. 11, and the laminar member 122. In FIG. 12, an arrow "g" indicates a direction of rotation of the driven one of the large-diameter support rollers 126, and an arrow "h" indicates a direction of rotation of the other large-diameter support roller 126 having the integrally formed driven gear 132 driven by the driving gear 130 of the above-indicated one large-diameter support roller 126. An arrow "i" indicates a direction of rotation of the laminar member 122, which is rotated in its circumferential direction while being nipped by the pair of large-diameter support rollers 126, and an arrow "j" indicates a direction of rotation of the small-diameter support roller 128 which engages the inner circumferential surface of the rotated laminar member 122 to support the laminar member 122. As shown in FIG. 12, radial gaps S are formed between circumferential portions of the adjacent metallic band members of the laminar member 122, which circumferential portions are spaced from the circumferential position at which the laminar member 122 is nipped by the pair of large-diameter support rollers 126.

Referring back to FIG. 11, the position of the above-indicated gaps S formed between the circumferential portions of the adjacent metallic band members of the laminar members 122, 124 as shown in FIG. 12 is moved relative to the metallic band members in the circumferential direction of the metallic band members, as the laminar members 122, 124 are rotated by the pair of large-diameter support rollers 126 which are rotated in the directions respectively indicated by the arrows "g" and "h" as the transferring jig 120 is fed by the conveyor 56 in the furnace chamber 52 in the direction indicated by the arrow "a". Accordingly, the nitriding gas can be sufficiently supplied through the above-indicated gaps S between the adjacent metallic band members of the laminar members 122, 124, over their entire circumference, while the laminar members 122, 124 each consisting of the plurality of metallic band members 12 laminated on each other are fed through the furnace chamber 52.

The present embodiment is identical with the previously described second embodiment, except for those aspects described above. Thus, the method of manufacturing the laminar ring 14 (16) according to the present embodiment makes it possible to increase the number of the metallic band members 12 that can be nitrided at one time, and improve efficiency of the nitriding treatment of the metallic band members 12, as in the second embodiment.

The method of manufacturing the laminar ring 14 (16) according to the present embodiment has the following advantage in addition to the advantage described above. Namely, the gaps S formed in the nitriding treatment step P23 between the adjacent metallic band members of the laminar members 122, 124 carried by the transferring jig 120 have a relatively large ratio of the circumferential length with respect to the entire circumference of the laminar members 122, 124, so that the nitriding gas can be sufficiently supplied between the metallic band members of the laminar members 122, 124, whereby the first through ninth metallic band members $12_1$-$12_9$ can be sufficiently nitrided.

Embodiment 4

In the method of manufacturing the above-described laminar ring 14 (16) according to the present embodiment, an aging treatment step P31 and a nitriding treatment step P32 shown in FIG. 8 are implemented to subject the plurality of metallic band members 12 laminated on each other in the laminating step P21, to the aging treatment and the nitriding treatment. The aging treatment step P31 and the nitriding treatment step P32 in the present embodiment are different from the aging treatment step P22 and the nitriding treatment step P23 in the above-described third embodiment, regarding the construction of a transferring jig 140 (shown in FIG. 13 referred to below) used to carry the above-described laminar members 122, 124.

Figure 13:
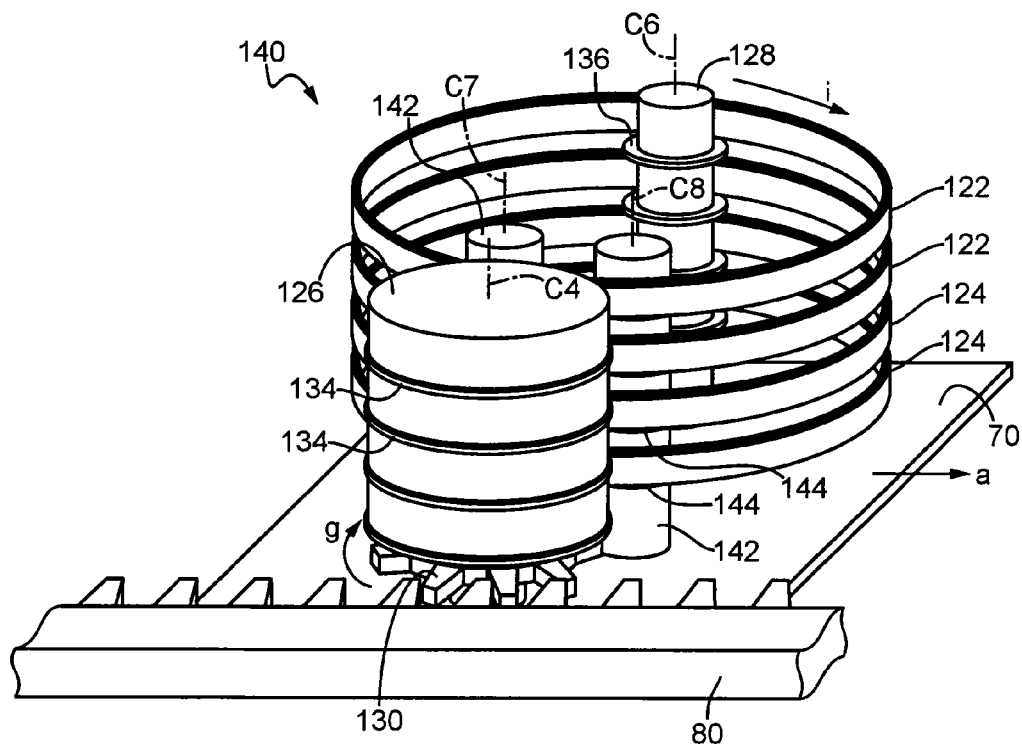
FIG. 13 is a view showing a transferring jig carrying laminar members continuously fed through the continuous furnace in the nitriding treatment step of FIG. 8 of a method of manufacturing a laminar ring according to another embodiment of the invention.

FIG. 13 is the view showing the transferring jig 140 according to this embodiment of the invention, which carries the two laminar members 122 and the two laminar members 124. As shown in FIG. 13, the transferring jig 140 is provided with a pair of small-diameter support rollers 142 in place of the above-described other large-diameter support roller 126 provided in the third embodiment. The small-diameter support rollers 142 are disposed on the transferring platform 70 rotatably about respective axes C7 and C8 perpendicular to the upper surface of the transferring platform 70 and which cooperate with the above-described one large-diameter support roller 126 to nip the laminar members 122 and 124. The axes C7 and C8 are located on an opposite side of the axis C4 with regard to the side of the laminar members 122, 124. Each of the above-described pair of small-diameter support rollers 142 has four radially extending flanges 144 spaced apart from each other at a predetermined spacing pitch in the direction of the corresponding axes. The four laminar members 122, 124 are held and supported in abutting contact at their lower end face with the corresponding flanges 134 and 136, which prevent downward movements and removal of the laminar members 122, 124 on and from the support rollers.

Figure 14:
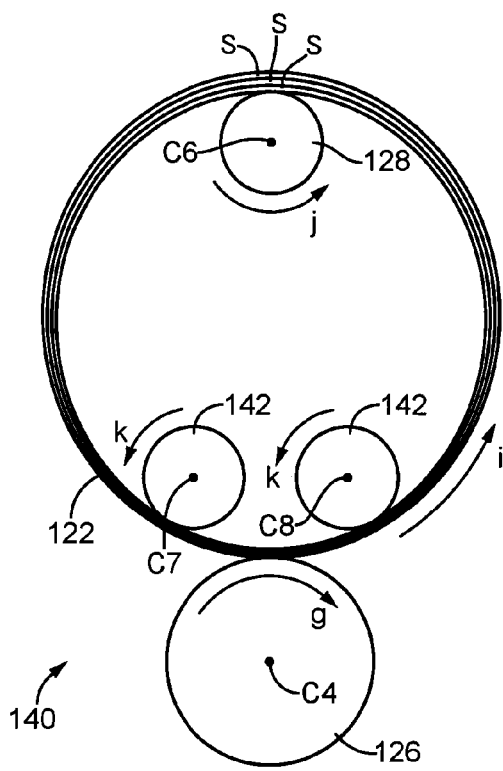
FIG. 14 is a plan view schematically illustrating a large-diameter support roller, a small-diameter support roller and a pair of small-diameter support rollers of the transferring jig of FIG. 13, and the laminar member.

FIG. 14 is the plan view schematically illustrating the large-diameter support roller 126, the small-diameter support roller 128 and the pair of small-diameter support rollers 142 of the transferring jig 140 of FIG. 13, and the laminar member 122. In FIG. 14, an arrow "k" indicates a direction of rotation of the pair of small-diameter support rollers 142 which engage the inner circumferential surface of the laminar member 122 to support the laminar member 122 rotated in its circumferential direction, and an arrow "l" indicates a direction of rotation of the laminar member 122, which is rotated in its circumferential direction. As shown in FIG. 14, radial gaps S are formed between circumferential portions of the adjacent metallic band members of the laminar member 122, which circumferential portions are spaced from the circumferential position at which the laminar member 122 is nipped by the large-diameter support roller 126 and the pair of small-diameter support rollers 142. This is also true to the laminar member 124.

Referring back to FIG. 13, the position of the above-indicated gaps S formed between the adjacent metallic band members of the laminar members 122, 124 as shown in FIG. 14 is moved relative to the metallic band members in the circumferential direction of the metallic band members, as the laminar members 122, 124 are rotated during the feeding movement of the transferring jig 140 by the conveyor 56 in the furnace chamber 52 in the direction indicated by the arrow "a". Accordingly, the nitriding gas can be sufficiently supplied through the above-indicated gaps S between the adjacent metallic band members 12 of the laminar members 122, 124, over their entire circumference, while the laminar members 122, 124 each consisting of the plurality of metallic band members 12 laminated on each other are fed through the furnace chamber 52.

The present embodiment is identical with the previously described third embodiment, except for those aspects described above. Thus, the method of manufacturing the laminar ring 14 (16) according to the present embodiment makes it possible to increase the number of the metallic band members 12 that can be nitrided at one time, and improve efficiency of the nitriding treatment of the metallic band members 12, as in the third embodiment.

The method of manufacturing the laminar ring 14 (16) according to the present embodiment has the following advantage in addition to the advantage described above. Namely, in the nitriding treatment step P32 the laminar members 122, 124 carried by the transferring jig 120 are nipped by the large-diameter support roller 126 and the pair of small-diameter support roller 142, so that the laminar members 122, 124 are given a suitable amount of radial yielding motion owing to their elasticity, between those support rollers 126, 142 and the laminar members 122, 124, whereby the laminar members 122, 124 can be suitably rotated by the large-diameter support roller 126.

Embodiment 5

In the method of manufacturing the above-described laminar ring 14 (16) according to the present embodiment, an aging treatment step P41 and a nitriding treatment step P42 in FIG. 8 are implemented to subject the plurality of metallic band members 12 laminated on each other in the laminating step P21, to the aging treatment and the nitriding treatment. The aging treatment step P41 and the nitriding treatment step P42 in the present embodiment are different from the aging treatment step P31 and the nitriding treatment step P32 in the above-described fourth embodiment, regarding the construction of a transferring jig 140 (shown in FIG. 13 referred to below) used to carry the above-described laminar members 122, 124.

Figure 15:
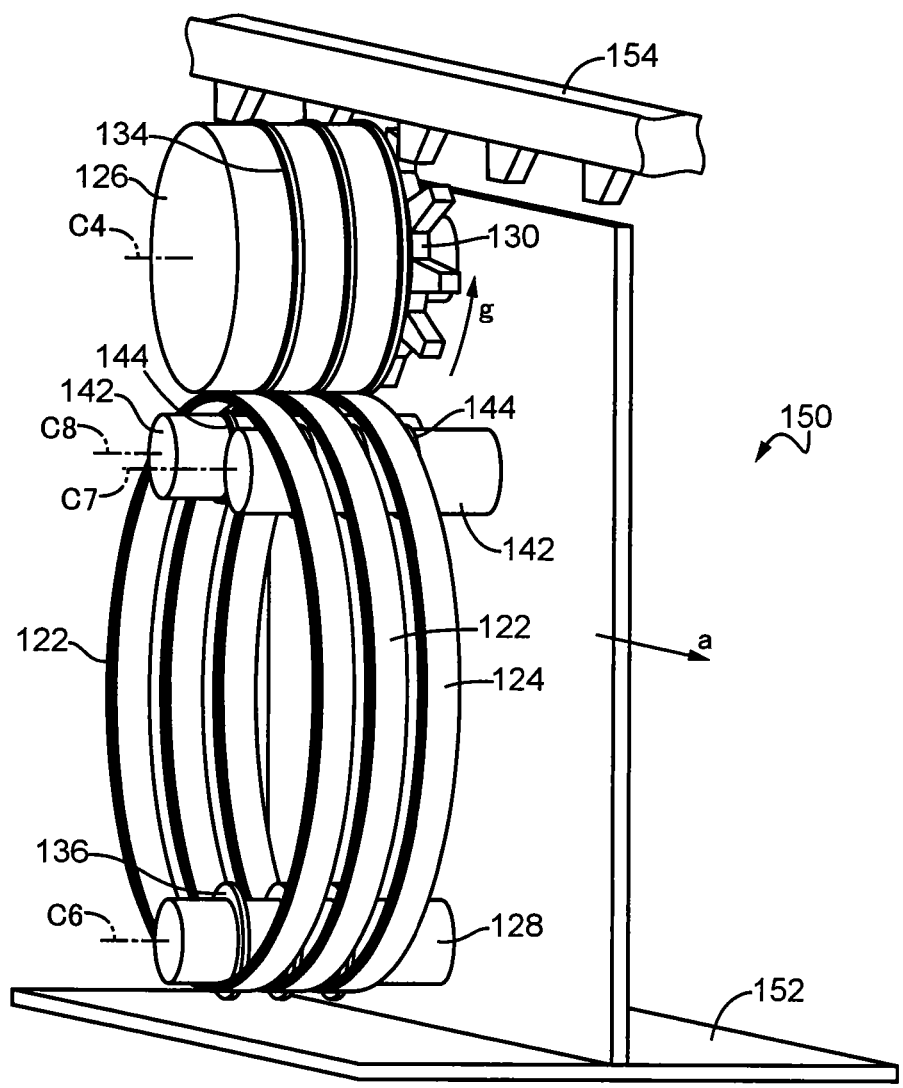
FIG. 15 is a view showing a transferring jig carrying laminar members continuously fed through the continuous furnace in the nitriding treatment step of FIG. 8 of a method of manufacturing a laminar ring according to a further embodiment of the invention.

FIG. 15 is the view showing the transferring jig 150 according to this embodiment of the invention, which carries the two laminar members 122 and the two laminar members 124. As shown in FIG. 15, the transferring jig 150 is different in posture from the transferring jig 140 provided in the above-described fourth embodiment, that is, rotated by 90 degrees in the clockwise direction as seen from rear side of the feeding direction of the transferring jig 140 indicated by the arrow "a", and is fixed at its lower end of the transfer platform 70 to a flat-shaped base plate 152 placed on the conveyor 56. In the furnace chamber 52 of the heating chamber portion 36, there is provided a stationary rack 154 which is held in engagement with the driving gear 130 of the transferring jig 150 fed by the conveyor 56, to rotate the driving gear 130. The position of the above-described gaps S formed between the adjacent metallic band members of each of the laminar members 122, 124 as shown in FIG. 14 is moved relative to the metallic band members in the circumferential direction of the metallic band members as the laminar members 122, 124 are rotated by rotation of the driving gear 130 by the rack 152 while the transferring jig 150 is fed through the furnace chamber 52 by the conveyor 56 in the feeding direction indicated by the arrow "a". Accordingly, the nitriding gas can be sufficiently supplied through the gaps S between the adjacent metallic band members 12 of each laminar member 122, 124 laminated on each other, over their entire circumference, while the laminar members 122, 124 are fed through the furnace chamber 52.

The present embodiment is identical with the previously described fourth embodiment, except for those aspects described above. Thus, the method of manufacturing the laminar ring 14 (16) according to the present embodiment makes it possible to increase the number of the metallic band members 12 that can be nitrided at one time, and improve efficiency of the nitriding treatment of the metallic band members 12, as in the fourth embodiment.

While the embodiments of this invention have been described in detail by reference to the drawings, it is to be understood that the invention is not limited to the foregoing embodiments, but may be otherwise embodied.

While the metallic band members 12 in the illustrated embodiments are formed of the hoop steel 20 of maraging steel, for instance, the metallic band members 12 may be formed of any other steel material.

It is to be understood that the mechanical arrangement in the illustrated embodiments for feeding the transferring jig 32 (110, 120, 140, 150) in the continuous furnace 30 in the nitriding treatment step P11 (P14, P23, P32, P42) has been described above, for illustrative purpose only, but may be modified as known in the art of transferring or feeding workpieces in a continuous furnace.

In the illustrated embodiments, the nitriding treatment step P11 (P14, P23, P32, P42) is implemented by using the continuous furnace 30 in which the transferring jig 32 (110, 120, 140, 150) carrying the plurality of metallic band members 12 is continuously fed in the furnace chamber 52. However, furnace equipment for implementing the nitriding treatment step need not be of a continuous type.

In the third and fourth embodiments described above, the transferring jig 120 (140, 150) need not be provided with the small-diameter support roller 128. Further, the small-diameter support roller 128 may be disposed for rolling contact with the outer circumferential surface of the laminar members 122, 124, to support the laminar members 122, 124.

It is to be understood that the foregoing embodiments and modifications have described for illustrative purpose only, and that the present invention may be embodied with various other changes and improvements which may occur to those skilled in the art, without departing from the spirit of this invention.

NOMENCLATURE OF REFERENCE SIGNS

10: Power transmitting belt
12: Metallic band members
$12_1$-$12_9$: First through ninth metallic band members
14, 16: Laminar rings
18: Elements
52: Furnace chamber
70: Transferring platform
72, 114: Support rollers
74: Gear (Rotary driving member)
130: Driving gear (Rotary driving member)
80, 154: Rack (Stationary engaging member)
126: Large-diameter support rollers (Support rollers)
128, 142: Small-diameter support roller (Support roller)
P11, P14, P23, P32, P42: Nitriding treatment step
S: Gaps

The invention claimed is:

1. A method of manufacturing a laminar ring which is used for a power transmitting belt of a belt-type continuously variable transmission for a vehicle and which is constituted by a plurality of annular endless metallic band members having respective different circumferential lengths and tightly laminated on each other to support a plurality of circularly arranged elements of the power transmitting belt, comprising:

a nitriding treatment step of subjecting surfaces of said plurality of metallic band members to a nitriding treatment wherein the metallic band members are kept in a controlled predetermined atmosphere for a predetermined length of time while gaps are formed between circumferential portions of adjacent ones of the metallic band members laminated on each other such that a position of said gaps is moved relative to the metallic band members in a circumferential direction of the metallic band members.

2. The method of manufacturing a laminar ring according to claim 1, wherein said gaps are formed by pressing said plurality of metallic band members laminated on each other constituting said laminar ring and having the respective different circumferential lengths, at a circumferential position of the metallic band members in a radially inward direction of the metallic band members.

3. The method of manufacturing a laminar ring according to claim 1, wherein said gaps are formed by laminating on each other a plurality of metallic band members corresponding to a same layer of said laminar ring of a same circumferential length selected from a plurality of sets of said metallic band members each of which constitutes said laminar ring, the metallic band members of each of said plurality of sets having respective different circumferential lengths, or laminating on each other a plurality of metallic band members of each of at least one set which constitutes said laminar ring such that a circumferential length of the metallic band members increases in a radially inward direction of the metallic band members.

4. The method of manufacturing a laminar ring according to claim 1, wherein said gaps are formed by laminating on each other a plurality of metallic band members of different circumferential lengths which are selected from said plurality of metallic band members constituting said laminar ring and which are not radially adjacent to each other.

5. The method of manufacturing a laminar ring according to claim 4, wherein said gaps are formed by laminating on each other a plurality of metallic band members which are selected from said plurality of metallic band members of the different circumferential lengths constituting said laminar ring, and which are odd-numbered or even-numbered as counted from the innermost metallic band member of the laminar ring.

6. The method of manufacturing a laminar ring according to claim 1, wherein said nitriding treatment step is implemented by using a nitriding furnace including:
- a transferring platform to be continuously fed in a furnace chamber having said controlled predetermined atmosphere;
- at least one pair of mutually parallel support rollers disposed rotatably on said transferring platform and engaging said plurality of metallic band members laminated on each other, to support the metallic band members; and
- a rotary driving member disposed rotatably on said transferring platform and engaging a stationary engaging member fixedly disposed in said furnace chamber, said rotary driving member being rotated by said stationary engaging member, to apply a torque to said support rollers for rotating the support rollers,
- and wherein said plurality of metallic band members laminated on each other and supported by said support rollers are rotated by the support rollers during continuous feeding of said transferring platform in said furnace chamber, so that the position of said gaps is moved relative to the metallic band members in the circumferential direction of the metallic band members.

* * * * *